Figure 1:
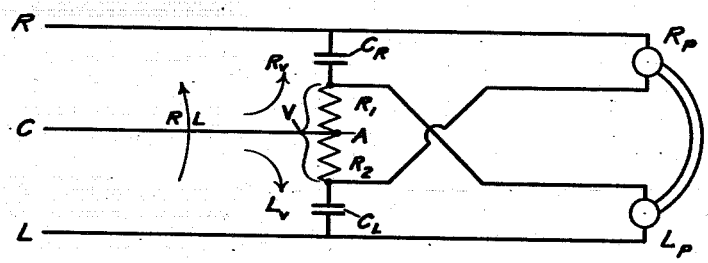

Feb. 2, 1937. L. BATCHELDER 2,069,208
ELECTRICAL CIRCUITS
Filed Sept. 16, 1931 2 Sheets-Sheet 1

INVENTOR
Laurence Batchelder
BY
Ezekiel Wolf
ATTORNEY

Patented Feb. 2, 1937

2,069,208

UNITED STATES PATENT OFFICE 2,069,208

ELECTRICAL CIRCUITS

Laurence Batchelder, Peterborough, N. H., assignor to Submarine Signal Company, Boston, Mass., a corporation of Maine Application September 16, 1931, Serial No. 563,153

10 Claims. (Cl. 177—386)

The present invention relates to apparatus for providing means for making more accurate measurements of short time intervals and in particular with increasing the accuracy of determining the direction of a source of wave energy. The invention may be applied to any type of wave energy but is more particularly applicable to determining the direction of the source of compressional wave energy in which the phase difference or binaural difference may be employed.

In determining the direction of a source of sound, particularly in submarine listening, it has been quite common in the prior art to use a group of hydrophones or magnetophones and to conduct the sound energy received by such receivers in two groups, one to one ear and the other to the other ear. Between the listening telephones and the detecting units, it is quite common to use a compensator which is employed for retarding the energy transmitted from the receivers to the listening telephones in such a manner that all of the energy is brought to the listening telephones in the same time phase. Apparatus of this nature is described in the Mason Patent No. 1,682,706, patented August 28, 1928, and in the Pierce Patent No. 1,682,712, patented August 28, 1928. The method of operating such a system may be either by observing the binaural center and noting the proper setting of the compensator for this position, or by producing a maximum or minimum response in the indicating device.

Each of the methods briefly mentioned above has certain advantages. The chief advantage in the binaural method lies perhaps in the fact that the operator is able to distinguish two sounds rather closely placed in the field and to determine the direction of one without great interference from the other. In the maximum method this is somewhat difficult on account of the fact that all of the energy is thrown together and the maximum may be produced by some sort of a combination of the two sources.

The present invention does not relate to a method of compensation, but relates more in particular to a method whereby the binaural impression is accentuated. It has recently been discovered that the binaural sense in the human ear is not entirely based upon the difference in time of arrival of the sounds at the two ears, but that the intensity enters into the binaural determination particularly on account of the fact that the head serves to some extent as a screen for screening the sound from the farthest ear. At low frequencies it appears that the phase difference is the chief factor, but for higher frequencies, that is frequencies somewhat above 1000 cycles, the intensity difference begins to play a more prominent part. In ordinary listening to sounds apparently the screening of the head reduces the intensity of these higher notes at the ear farthest from the source and it is this intensity difference at higher frequencies which is used in determining the direction of the sound source.

In the art of binaural listening as previously practised the phase difference alone has been used and the sounds observed have so far as possible had the same intensity. On account of this fact the direction was entirely determined on account of the low pitched components of the noise or signal listened to and apparently the high pitched sounds were entirely ignored. They even under some conditions caused difficulties in the way of determining a proper binaural center.

In remedying this difficulty I have employed along with the phase and time difference in the binaural method an intensity difference which accentuates the lateral effect in a manner similar to the screening of the head in ordinary listening. The device which I employ tends to increase the intensity of whatever signal, right or left, leads the other in phase while at the same time it diminishes the intensity of the other signal. There may also be, besides an amplification in intensity, an amplification of the phase difference.

Figure 2:
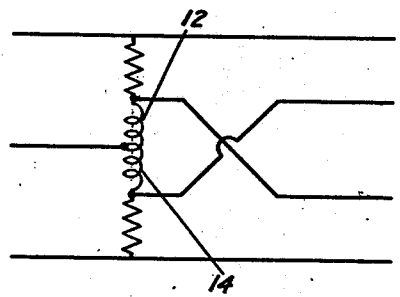
Figure 3:
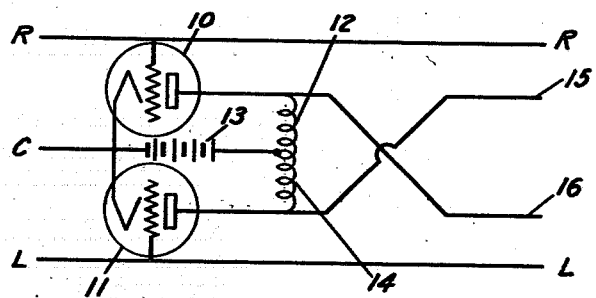
Figure 4:
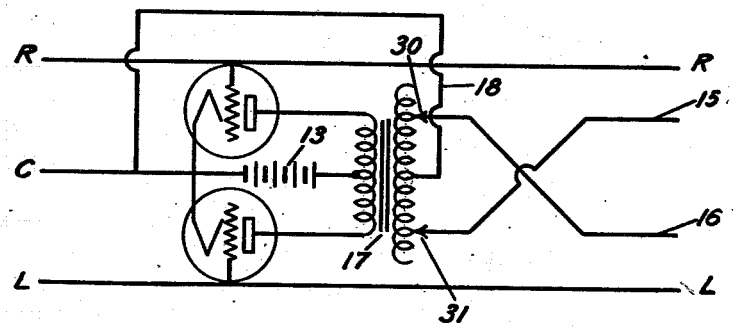
Figure 5:
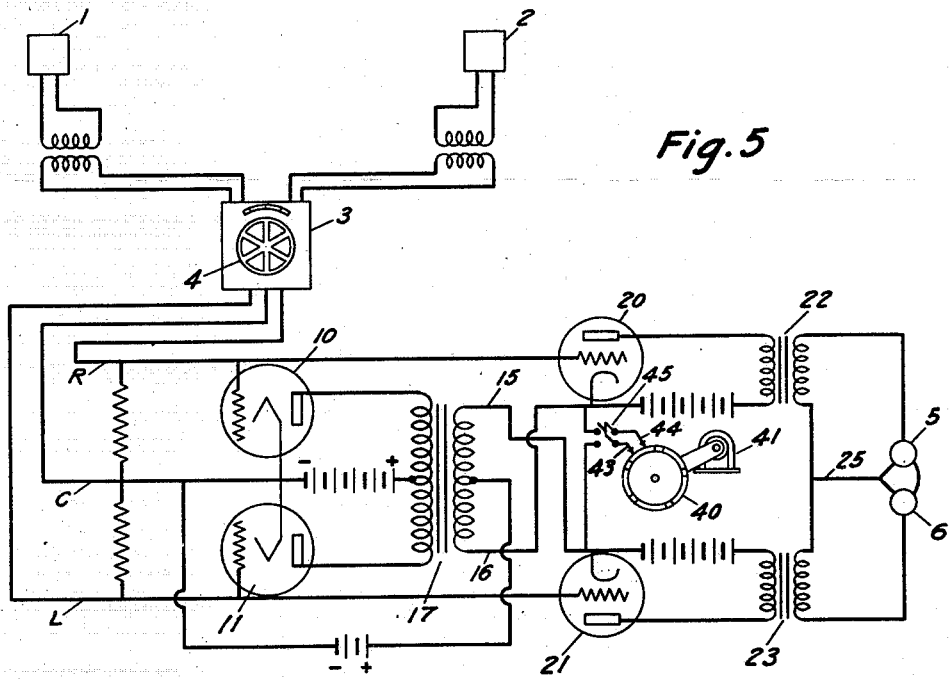
Figure 6:
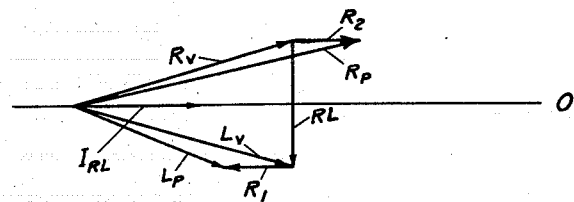

The invention will be more fully described in connection with the drawings in which Figure 1 shows the fundamental phase circuit; Figure 2 shows a modification of this circuit; Figure 3 shows a further modification; Figures 4 and 5 show a further development and modification of the circuit illustrated in Figure 3; and Figure 6 is a vector diagram of the fundamental circuit shown in Figure 1.

In Figure 5 is shown the application of the system to binaural direction determination of a source of sound. 1 and 2 in this figure are sound detectors which might be magnetophones or hydrophones placed in water overboard of a vessel and in a suitable frame, or the detectors may be mounted in the skin of the ship.

While only two sound receivers are shown, more than two may be used in the same manner as described in the Mason patent and the Pierce patent mentioned above. The energy received by the receivers 1 and 2 may be converted into electric energy and transmitted over the artificial lag line of the compensator 3, by which the proper retardation is selected by means of the handwheel 4. The differential device is connected between the compensator 3 and the binaural head telephones 5 and 6 by means of a common line C and two lines designated R for right and L for left.

The fundamental differential circuit is illustrated in Figure 1 and may be illustrated as having a capacity $C_R$ and a second capacity $C_L$ connected respectively from the right and the left lines together by means of a small resistance designated V in the figure. The common line C is connected to the middle point A of the resistance V dividing the resistance into two equal components $R_1$ and $R_2$. The right telephone $R_p$ is connected from the right line to the end of the resistance $R_2$ and the left telephone is similarly connected to the left line and to the end of the resistance $R_1$. The telephone impedance in the range of working frequencies is large compared to impedance of $R_1$, $R_2$, $C_R$, $C_L$.

If the circuit is analyzed by consideration of the vectors, it may be assumed, as shown in Figure 6, that the vector voltage $R_v$ from the common to the right side of the line and the vector voltage $L_v$ from the common to the left side of the line are represented as indicated in the figure.

The difference voltage of these two vectors may be indicated by the vector RL. Since the resistance R is small as compared with the capacity reactances $C_R$ and $C_L$, the current produced by the vector voltage RL will lead the voltage by approximately ninety degrees. This vector is represented as $I_{RL}$ and the voltage drop across the resistance therefore is represented as $R_2$ and $R_1$. It will be noted that the drop $R_1$ is in the opposite direction from the voltage $L_v$ and the drop $R_2$ is in the same direction as the drop $R_v$. The resultant vector across the right phone $R_p$ made up of the two vectors $R_v$ and $R_2$ is $R_p$, while the resultant voltage across the phone $L_p$ is the vector $L_p$. It will be seen from the vector diagram in Figure 6 that the intensity of the signal has been increased in the right phone and diminished in the left phone. The vector diagram illustrated in Fig. 6 is not, of course, absolutely correct since the current vector $I_{RL}$ is not ninety degrees ahead of the vector voltage RL, but this is substantially true when it is considered that the reactances of the capacities $C_R$ and $C_L$ are large as compared with the resistances in the circuit.

Instead of using a large capacity reactance and a small resistance, a large resistance and a small inductance might be used as indicated in Figure 2.

The potential drops across the inductances 12 and 14 in Figure 2 are approximately proportional to the frequency of the impressed signal. In consequence of this, the difference in intensities of the output voltages $R_1$ and $R_2$ in Figure 6 is made to increase with frequency, as does the screening effect of the human head in ordinary listening.

In Figure 3 are shown thermionic tubes 10 and 11 whose internal plate to cathode resistances serve the same purpose as the resistances shown in Figure 2. The thermionic tubes 10 and 11 are connected across from the common to the right and left side of the line, respectively. The grid of the tube 10 is connected to the right side of the line while the filament is connected to the neutral or common line and so also the plate through an inductance 12 and the battery 13. The left side of the line is similarly connected with an inductance 14 which is balanced with the inductance 12 and may be coupled, as indicated, with it to produce a true 180 degree phase difference between the voltages across the inductances. The head telephone on the right side of the line is connected across from R to the line 15 and on the left side of the line from L to the line 16. It will be noted that the voltage across the headphones on the right side of the line from R to 15 is made up of the potential drop across the small inductance 14 and the potential drop RC across the line itself. The potential drop in the inductance 14, it will be noted on consideration of Figure 6, is 90 degrees out of phase with the drop across the line RL, and this voltage adds up to produce with the vector RC a larger vector $R_p$ across the right phone if the vector RC is leading. In a similar manner the vector across the left telephone will be decreased.

The voltage gain brought about by the introduction of the thermionic tubes makes the voltage drops across the inductances 12 and 14 in Figure 3 of the same order of magnitude as the drops RC and LC as shown in Figure 3 across the line itself. The tubes 10 and 11 provide infinite impedances looking into the tubes from the line and allow a proper choice of terminating impedance for the line itself independent of the differential circuit.

In Figure 4 in place of the inductances 12 and 14 a balanced transformer 17 is used having a secondary center tap 18 connecting with the neutral C in the line. Variable taps 30 and 31 may be provided on the secondary of the transformer 17 to provide the desired voltage ratio between primary and secondary. The use of a transformer allows the center tap to be connected to the low potential side of battery 13. It will be noted that this is impossible in Figure 3.

In Figure 5 a further modification is provided by amplifying the vector produced across the line R15 and L16 in Figure 4. This is obtained by the use of amplifier tubes 20 and 21 connected respectively in the right and left sides of the line. The head phones 5 and 6, as indicated in Figure 5, may be coupled to the output of the tubes 20 and 21 by means of the transformers 22 and 23, respectively. The secondaries of the transformers 22 and 23 may be connected with a common lead 25 to the telephones since there is no voltage between them.

In order to have a clear indication of whether a perfect balance has been obtained, a commutator 40 is provided driven by the motor 41 The commutator may have a definite speed corresponding to an audio-frequency note of the desired pitch and it may be placed in circuit in such a manner as to short circuit periodically the secondary of the transformer 17. In this manner alternately the differential circuit is cut in and out since when the secondary of the transformer 17 is short circuited, the cathodes of tubes 20 and 21 are effectively directly connected to the common of the line, and the tubes 20 and 21 are therefore directly across the right and left half of the line respectively.

The vector voltage applied to the telephone is therefore periodically increased in one or the other ear as the case may be unless a balance is obtained, and as a result a tone will be produced of the commutator frequency which will be easily recognized. If no commutator tone is present, the listener will know that he has obtained a balance. The commutator brushes 43 and 44 are so spaced that half the time a single commutator segment is beneath both brushes and half the time each brush is under different segments, thus opening the circuit. In this manner an even note is produced.

When it is desired to use the commutator the switch 45 is closed, otherwise it remains in an open position.

While Figure 5 shows the use of one stage of amplification on each side of the line, it is possible, of course, to use more than one stage of amplification.

By the use of the heater type of tube a single battery source may be used for all tubes, but otherwise this would not be possible in the tubes 20 and 21 since the cathodes are at different potentials.

Having now described my invention I claim:

1. In combination with means for differentially varying the intensity of signal received in individual receivers of a binaural set, means for determining when a balance has been obtained comprising a commutator for applying and removing the differentially varying means at a rate to produce a definite recognizable note unless a balance has been obtained.

2. Arrangement for emphasizing the binaural effect in a system having two circuits, means for producing alternating current of the same periodicity having original vectors in each circuit and means for varying the phase of said currents with respect to each other, said arrangement comprising electrical means for producing one vector component substantially in the same direction as one of the original vectors and another component in substantially the opposite direction to the other original vector and means in each circuit for indicating the resultant of the respective original and component vectors.

3. Arrangement for emphasizing the binaural effect in a system having two circuits formed by a neutral and two line conductors, means for producing alternating current of the same periodicity in each circuit and means for varying the phase of said currents with respect to each other, said arrangement comprising two impedance units each including a small resistance and a condenser of large reactance connected in series, the free resistance terminals of said units being connected together and to said neutral while the free condenser terminals are connected each to one of said line conductors, and two indicating means each of which is connected between one line conductor and the condenser-resistance junction in the impedance unit which lies between the opposite line conductor and the neutral.

4. Arrangement for emphasizing the binaural effect in a system having two circuits formed by a neutral and two line conductors, means for producing alternating currents of the same periodicity in each circuit and means for varying the phase of said currents with respect to each other, said arrangement comprising two impedance units each including a small inductance and a large resistance connected in series, the free inductance terminals of said units being connected together and to said neutral while the free resistance terminals are connected each to one of said line conductors, and two indicating means each of which is connected between one line conductor and the resistance-inductance junction in the impedance unit which lies between the opposite line conductor and the neutral.

5. Arrangement for emphasizing the binaural effect in a system having two circuits formed by a neutral and right and left line conductors, means for producing alternating current of the same periodicity in each circuit and means for varying the phase of said currents with respect to each other, said arrangement comprising thermionic tube means providing effective high resistance, similar units of which are connected in the same manner to each line conductor and to the opposite ends of an inductance of low reactance whose center point is connected to said neutral, and two indicating means each of which is connected between one line conductor and the extremity of said inductance extending toward the opposite line conductor.

6. Arrangement for emphasizing the binaural effect in a system having two circuits formed by a neutral and right and left line conductors, means for producing alternating current of the same periodicity in each circuit and means for varying the phase of said currents with respect to each other, said arrangement comprising two thermionic tubes each having its grid connected to one of said lines respectively and its cathode to the neutral, an inductance connected between the anode of each tube and the neutral, both of said inductances having the same value, and binaural listening means having left and right indicators each connected between one of said lines and the end remote from the neutral of the inductance extending toward the opposite line.

7. Arrangement for emphasizing the binaural effect in a system having two circuits formed by a neutral and right and left line conductors, means for producing alternating current of the same periodicity in each circuit and means for varying the phase of said currents with respect to each other, said arrangement comprising a first pair of thermionic tubes each having its grid connected to one of said lines respectively and its anode and cathode to the neutral, a balanced transformer having a primary with center tap connected to neutral and its extremities each to one of said anodes, a second pair of thermionic tubes each having its grid connected to one of said lines respectively, a secondary for said transformer likewise having a center tap and having its extremities connected each to the anode and cathode one of said second pair of tubes and means for grounding the center tap of said secondary to neutral.

8. Arrangement for emphasizing the binaural effect in a system having two circuits formed by a neutral and two line conductors, means for producing alternating current of the same periodicity in each circuit and means for varying the phase of said currents with respect to each other, said arrangement comprising two impedance units each including a small inductance and a large resistance connected in series between each line conductor and the neutral, two indicating means each connected by one terminal to one of said line conductors, respectively, and by the other terminal adjustably to one of said inductances, respectively.

9. Arrangement for emphasizing the binaural effect in a system having two circuits formed by a neutral and right and left line conductors, means for producing alternating current of the same periodicity in each circuit and means for varying the phase of said currents with respect to each other, said arrangement comprising a first pair of thermionic tubes each having its grid connected to one of said lines, respectively, and its anode and cathode to the neutral, a balanced transformer having a primary with center tap connected to neutral and its extremities each to one of said anodes, a secondary for said transformer, binaural listening means having left and right indicators and means for effectively connecting each of said indicators to one of said line conductors and to that portion of said secondary which is more closely associated with the opposite line conductor.

10. Arrangement for emphasizing the binaural effect in a system having two circuits formed by a neutral and right and left line conductors, means for producing alternating current of the same periodicity in each circuit and means for varying the phase of said currents with respect to each other, said arrangement comprising two thermionic tubes each having its grid connected to the right and left line conductors, respectively, and its cathode to neutral, a balanced transformer having a center tapped primary and secondary, said primary having its center tap connected to the neutral and its extremities to the anodes of said tubes, respectively, a second group of thermionic tubes likewise having grids connected to said right and left line conductors, respectively, and anodes connected to the portion of said secondary which is more closely associated with the opposite line conductor, means for grounding the center tap of said secondary to neutral, output transformers having primaries connected in the anode circuits of said second group of tubes, respectively, and secondaries connected in series and a binaural telephone comprising two receivers each being connected to the free end of the secondary of one of said output transformers, respectively, and by a common conductor to the series connection between said secondaries.

LAURENCE BATCHELDER.